Figures 1, 2, 3:
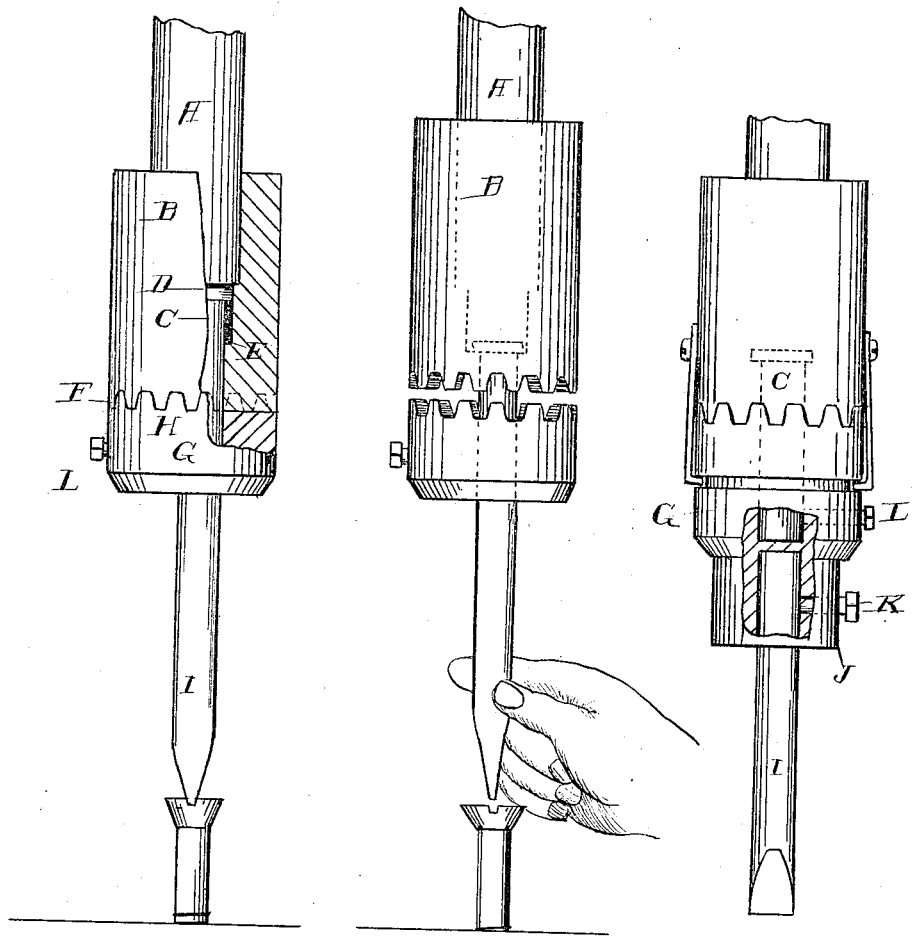

(No Model.)

F. M. MALEY.
DEVICE FOR DRIVING SCREWS.

No. 320,373. Patented June 16, 1885.

WITNESSES:
Robert Kirk
Dugald McKillop.

INVENTOR:
Frank M Maley
By
Attorney.

UNITED STATES PATENT OFFICE.

FRANK M. MALEY, OF CINCINNATI, OHIO.

DEVICE FOR DRIVING SCREWS.

SPECIFICATION forming part of Letters Patent No. 320,373, dated June 16, 1885.

Application filed October 15, 1884. (No model.)

*To all whom it may concern:*

Be it known that I, FRANK M. MALEY, of Cincinnati, in the county of Hamilton and State of Ohio, have invented a new and useful Improvement in Devices for Driving Screws, which improvement is fully set forth in the following specification and accompanying drawings, in which—

Figure 1 is a vertical view, partly in section, showing the device for driving screws while in the process of driving the screw home. Fig. 2 is a vertical view of the same preparatory to driving the screw; and Fig. 3 is a detailed sectional view of the lower part of the device, showing the manner of inserting the bit.

The object of this invention is to provide a simple and easily-operated device for driving screws by means of machinery; and to this end it consists of a mandrel having shrunk thereon at the lower end a cylindrical head. Within the hollow of this cylindrical head is placed a spindle, which may be either the bit itself or the part to which the bit is attached, which spindle is provided with a toothed clutch to engage with the toothed lower end of the cylindrical head, and, the spindle being adapted to move vertically a limited distance within the cylindrical head, causes the clutch to engage with the toothed end of the cylindrical head and rotate the bit, all of which will now be fully set forth in detail.

In the accompanying drawings, A represents the mandrel, and B the cylindrical head having an aperture of the same size as the mandrel. The lower end of the head B has centrally a smaller aperture to receive the spindle C. The spindle is provided with a head, D, and the upper end of the cylinder B is shrunk on the lower end of the mandrel A, so as to provide a space between the lower end of the mandrel A and the annular shoulder E within the cylindrical head B, upon which the head D of the spindle C rests when at its lowest limit. The lower end of the cylindrical head B is provided with radiating teeth or cogs F, as shown in Figs. 1 and 2. Below this cylinder and secured to the spindle, adjustable or otherwise, is a collar, G, the upper surface of which is provided with radiating teeth or cogs H, adapted to mesh with the cogs F of the head D.

It will be observed in Fig. 3 that the bit I is constructed separately from the spindle C. In Fig. 1 the spindle C itself is the bit; but it is obvious that provision should be made for attaching the bit I to the spindle C. To accomplish this the collar G is provided in the extension J in the lower end, and the spindle C extends only as far down as the lower end of the collar G, thereby allowing the bit I to be inserted in the socket of the part J and held in place by means of a set-screw, K. The set-screw L, through the collar G, serves to hold the collar adjustable at any point on the spindle C.

The operation of the device is as follows: The mandrel A is journaled so as to have a limited end motion, and at the same time the spindle C is longitudinally movable in the cylindrical head. When the spindle is drawn down to its lowest limit, the cogs F H disengage, and the rotary motion of the mandrel does not affect the spindle and bit. When, therefore, the bit, as shown in Fig. 2, is inserted in the groove of the screw-head, the mandrel is moved downward so that the teeth F engage the teeth H of the collar and cause the bit to drive the screw home.

Having described my invention, what I claim as new is—

1. In a device for driving screws, the mandrel A, having on its lower end the cylindrical head provided within with a space to receive the upper end of the bit-spindle, and having an annular shoulder, E, and provided on its lower end with radiating cogs, in combination with the bit-spindle C, having on its upper end a head, D, and a collar, G, also having radiating cogs H, the said spindle being capable of a limited end motion within the cylindrical head, as and for the purposes substantially as herein set forth.

2. The combination, with the mandrel A, of a hollow cylinder, B, shrunk thereon, and having radial teeth on its lower end, and a shoulder, E, at the lower end of the chamber in said hollow cylinder, in combination with a headed spindle, and a toothed collar, G, substantially as and for the purposes described.

In testimony that I claim the foregoing I have hereunto set my hand, this 30th day of September, 1884, in the presence of witnesses.

FRANK M. MALEY.

Witnesses:
J. S. ZERBE,
WALTER ALCOKE.